(12) United States Patent
Takemura et al.

(10) Patent No.: US 11,067,123 B2
(45) Date of Patent: Jul. 20, 2021

(54) LINEAR MOTION GUIDE UNIT

(71) Applicant: NIPPON THOMPSON CO., LTD., Tokyo (JP)

(72) Inventors: Ayana Takemura, Kamakura (JP); Shigemasa Itabashi, Kamakura (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 16/720,079

(22) Filed: Dec. 19, 2019

(65) Prior Publication Data

US 2021/0190141 A1 Jun. 24, 2021

(51) Int. Cl.
*F16C 29/06* (2006.01)
*F16C 33/66* (2006.01)
*F16C 29/08* (2006.01)

(52) U.S. Cl.
CPC ........ *F16C 29/0609* (2013.01); *F16C 29/065* (2013.01); *F16C 29/0623* (2013.01); *F16C 29/0611* (2013.01); *F16C 29/086* (2013.01); *F16C 33/6622* (2013.01); *F16C 33/6648* (2013.01); *F16C 2208/20* (2013.01); *F16C 2322/39* (2013.01)

(58) Field of Classification Search
CPC .............. F16C 29/0609; F16C 29/0623; F16C 29/0626; F16C 29/065; F16C 29/0666; F16C 29/086; F16C 33/6622; F16C 33/6648; F16C 33/6685; F16C 2208/20; F16C 2300/54; F16C 2322/39
USPC .................... 384/15, 43–45, 49, 50
See application file for complete search history.

(56) References Cited

U.S. PATENT DOCUMENTS

| | | | | |
|---|---|---|---|---|
| 5,139,347 A | * | 8/1992 | Hattori | F16C 29/0609 384/15 |
| 5,800,064 A | * | 9/1998 | Ohya | F16C 29/065 384/44 |
| 6,213,646 B1 | * | 4/2001 | Yabe | F16C 29/0609 384/15 |
| 6,712,511 B2 | * | 3/2004 | Matsui | F16C 29/064 384/45 |

(Continued)

FOREIGN PATENT DOCUMENTS

| CN | 1749589 A | * | 3/2006 | .......... F16C 29/0609 |
|---|---|---|---|---|
| EP | 1236913 A1 | * | 9/2002 | .......... F16C 29/0695 |

(Continued)

*Primary Examiner* — Marcus Charles
(74) *Attorney, Agent, or Firm* — Browdy and Neimark, P.L.L.C.

(57) ABSTRACT

A linear motion guide unit has sleeves which form return passages and are formed of a high temperature resistant resin material which allows use in a high temperature environment. In the linear motion guide unit, spaces serving as grease pools are formed in the sleeves inserted into insertion holes of a carriage. The sleeves are formed of a thermoplastic resin whose heat distortion temperature is higher than 80° C. Each sleeve is formed by combining split circular members obtained by dividing a cylindrical member into two pieces along the longitudinal direction, and a plurality of grooves which become spaces are formed on the inner circumferential surfaces of the sprit circular members through cutting orthogonal to a parting plane between the split circular members.

5 Claims, 6 Drawing Sheets

(56) References Cited

U.S. PATENT DOCUMENTS

| | | | |
|---|---|---|---|
| 8,465,206 B2* | 6/2013 | Kondo | F16C 33/6648 384/45 |
| 2003/0053724 A1* | 3/2003 | Matsui | F16C 29/0609 384/45 |
| 2006/0078237 A1* | 4/2006 | Ishihara | F16C 29/065 384/45 |
| 2007/0071372 A1* | 3/2007 | Kuwabara | F16C 29/0611 384/44 |
| 2009/0016654 A1* | 1/2009 | Kakei | F16C 29/0611 384/44 |
| 2013/0108193 A1* | 5/2013 | Kuwabara | F16C 29/0611 384/13 |
| 2015/0219151 A1* | 8/2015 | Kuwabara | F16C 29/0611 384/44 |
| 2015/0369282 A1* | 12/2015 | Takahashi | F16C 29/0673 384/44 |

FOREIGN PATENT DOCUMENTS

| | | | | |
|---|---|---|---|---|
| EP | 1645763 A1 * | 4/2006 | | F16C 29/0611 |
| JP | 0972335 A | 3/1997 | | |
| JP | 1078032 A | 3/1998 | | |
| JP | 200182469 A | 3/2001 | | |
| JP | 5820187 B2 * | 11/2015 | | F16C 33/6648 |
| JP | 2015224783 A * | 12/2015 | | F16C 33/6611 |
| JP | 2016048085 A * | 4/2016 | | F16C 29/06 |
| JP | 6320772 B2 * | 5/2018 | | F16C 29/0611 |
| KR | 20150091541 A * | 8/2015 | | F16C 29/0611 |

* cited by examiner

LINEAR MOTION GUIDE UNIT

FIELD OF THE INVENTION

The present invention relates to a linear motion guide unit which is applied to sliding sections of, for example, semiconductor fabrication apparatuses, various types of assembling apparatuses, measuring and testing apparatuses, etc. and which has a slider movable in relation to a guide rail in its longitudinal direction.

BACKGROUND OF THE INVENTION

Conventionally, such a linear motion guide unit has been applied to sliding sections of various apparatuses, such as reciprocating mechanisms of semiconductor fabrication apparatuses, various types of assembling apparatuses, etc. Demands have been placed on these various types of apparatuses in terms of energy savings, simpler structures, reduced production costs, and reduced facility maintenance costs. Also, demands have been placed on linear motion guide units used in these apparatuses, in terms of no need for lubrication maintenance, low cost, and small weight and size.

Japanese Patent Application Laid-Open No. H09-72335 discloses a known linear motion rolling guide unit in which return passages are formed by sleeves inserted into return holes formed in a carriage. The sleeves are configured to be elastically deformable so as to reduce sliding resistances acting on rolling elements, thereby guaranteeing smooth rolling of the rolling elements. Specifically, in the linear motion rolling guide unit, a sleeve for forming a return passage for cylindrical rollers is inserted in each return hole of the carriage and extends over the entire length of the return hole. A gap is formed between the wall surface of the return hole and the outer surface of a small diameter part of the sleeve so that the sleeve elastically deforms. The sleeve has a slit extending in its longitudinal direction, and opposite ends of the sleeve are held in the return hole of the carriage. The sleeve is composed of half-split sleeves formed of a synthetic resin.

Also, Japanese Patent Application Laid-Open No. H10-78032 discloses a known lubrication linear guide device in which rolling elements are lubricated using a lubricant-containing polymer. In the lubrication linear guide device, a rolling element circulation tube is inserted into each rolling element return path of a slider body. The rolling element circulation tube includes a cage-like cylindrical reinforcing member formed of polyethylene and having elongated holes extending in its axial direction, and a lubricant-containing polymer member integrally formed in the elongated holes. The lubricant-containing polymer member is formed of a lubricant-containing polymer having a composition of a paraffinic mineral oil, a low molecular weight polyethylene, and a high molecular weight polyethylene. Thus, the reinforcing material and the lubricant-containing polymer are firmly joined together without causing separation therebetween, whereby the strength of the lubricant-containing polymer member is enhanced.

Also, Japanese Patent Application Laid-Open No. 2001-82469 discloses a known linear motion rolling guide unit which includes a slider having return passage holes formed by a sintered resin member having a porous structure. Specifically, in order to endlessly circulate rolling elements (balls), a sleeve-shaped sintered resin member having a porous structure is inserted into each of insertion holes of the slider, which slides on a guide rail via balls, and a return passage hole through which the balls pass is formed in the sintered resin member. The sintered resin member continuously supplies a lubricant or grease to the balls, and lubricates the load-carrying race via the balls, thereby enhancing durability and reducing the sliding resistance of the slider. Also, the sleeve-shaped sintered resin member has recesses and/or slits which serve as lubricant pools.

Incidentally, in such a conventional linear motion guide unit, a sleeve for forming a return passage is inserted into each insertion hole of a carriage, and, through formation of a slit or the like, a clearance is provided between the wall surface of the insertion hole and the outer surface of the sleeve so as to form a lubricant pool for lubricating rolling elements. However, the conventional linear motion guide units are not designed in consideration of use in a high-temperature environment. For example, Japanese Patent Application Laid-Open No. H9-72335 contains no description showing consideration of the type of the synthetic resin used for fabricating the sleeves. In the linear motion guide units disclosed in Japanese Patent Application Laid-Open Nos. H10-78032 and 2001-82469, the sleeves forming the return passages are formed of a lubricant-containing polymer such as polyethylene. Therefore, when these linear motion guide units are used in a high-temperature environment whose temperature is higher than 80° C., they have a problem in that the lubricant-containing polymer constituting the sleeves thermally softens and becomes unusable. Therefore, there has been demand for a linear motion guide unit in which the sleeves forming the return passages are formed through use of a synthetic resin whose heat distortion temperature is higher than that of polyethylene resin so that the sleeves do not thermally deform.

SUMMARY OF THE INVENTION

The present invention has been conceived to solve the above problem, and an object of the present invention is to provide an improved linear motion guide unit in which sleeves forming return passages do not soften; namely, do not thermally deform even when the linear motion guide unit is used in a high-temperature environment. In the improved linear motion guide unit, each sleeve is formed of a high temperature resistant resin material such as a resin material which can be used in an environment whose normal temperature is 100° C. and whose highest temperature is 120° C. Examples of such a high temperature resistant resin material include polyamide synthetic resin, polytetrafluoroethylene (PTFE), and polyether ether ketone (PEEK). Since these resins are not porous, they cannot have lubricating performance by themselves. Therefore, in the improved linear motion guide unit, in order to improve the rolling element lubricating performance of the sleeves, the sleeves themselves are formed to have a clearance, such as a groove or a slit, which serves as a lubricant pool (i.e., grease pool) which holds and supplies a lubricant. Thus, the sleeves supply a lubricant to rolling elements rolling through the sleeves, thereby expanding lubrication life and realizing long life.

Means to Solve the Problems

The present invention relates to a linear motion guide unit comprising an elongated guide rail having a first raceway groove formed along each of opposite sides extending in a longitudinal direction; and a slider which slides on the guide rail in the longitudinal direction. The slider includes a carriage which has a second raceway groove extending to face the first raceway groove of the guide rail and an insertion hole extending along the second raceway groove; a sleeve which is inserted into the insertion hole so as to form a return passage; a pair of end caps which are attached to opposite end surfaces of the carriage and each of which has a turnaround passage communicating with the return passage and a load-carrying race formed between the first raceway groove and the second raceway groove; and a plurality of rolling elements which roll through a circulation passage formed by the load-carrying race, the return passage, and the paired turnaround passages. The sleeve is formed of a thermoplastic resin whose heat distortion temperature is higher than 80° C., and has a space serving as a grease pool.

The heat distortion temperature of the sleeve falls within a range of 80° C. to 300° C.

The thermoplastic resin is polyimide resin, polyamide-imide resin, ABS resin, polyethylene terephthalate (PET) resin, polyamide resin, polyacetal resin, polytetrafluoroethylene (PTFE) resin, polyphenylenesulfide resin, or polyether ether ketone (PEEK) resin. Specifically, the polyamide resin which is the thermoplastic resin is polyamide 66 resin.

The sleeve is formed by combining split circular members obtained by dividing a cylindrical member into at least two pieces along the longitudinal direction, and, in order to form the space serving as the grease pool, a plurality of grooves or a plurality of slits are formed in the split circular members through cutting orthogonal to a parting plane between the split circular members.

The end caps are formed of a thermoplastic resin whose heat distortion temperature is higher than 80° C. Specifically, the heat distortion temperature of the end caps falls within a range of 80° C. to 300° C.

Effect of the Invention

The linear motion guide unit according to the present invention is characterized in that, as described above, a sleeve is inserted into an insertion hole formed in the carriage, a return passage is formed by the sleeve, the sleeve is formed of a thermoplastic resin whose heat distortion temperature is higher than 80° C. which is the heat distortion temperature of polyethylene, and a space serving as a lubrication pool (i.e., grease pool) is formed. The carriage, the guide rail, etc. are formed of martensitic stainless steel. In this linear motion guide unit, the sleeve is formed of the above-mentioned thermoplastic resin. Therefore, even when the present linear motion guide unit is used under a high speed and high acceleration condition or used in a high temperature environment, the sleeve does not thermally deform, and a sufficient amount of a lubricant (i.e., grease) can be supplied to the rolling elements through the sleeve, whereby lubrication performance can be enhanced. Also, the sleeve formed by combining split circular members (semi-circular members) obtained by dividing a cylindrical member into at least two pieces has a plurality of grooves or slits formed through cutting orthogonal to the parting plane between the split circular members. Therefore, the shapes of upper and lower dies used for molding the split circular members of the sleeve can be made simple. Thus, after molding of the sleeve, the upper and lower dies can be easily separated from the sleeve (molded product) by moving the upper and lower dies orthogonal to the parting plane, whereby production cost can be decreased.

The heat distortion temperature of each material is determined by the method prescribed in ASTM D648 (bending stress: 4.6 kgf/cm2). The thermoplastic resin used to form the sleeve is, for example, polyimide resin, polyamide-imide resin, ABS resin, PET resin, polyamide resin, polyacetal resin, PTFE resin, polyphenylenesulfide resin, or polyether ether ketone resin. The heat distortion temperature of the above-mentioned thermoplastic resins are as follows. The heat distortion temperature of polyamide-imide resin is 282° C. The heat distortion temperature of ABS resin is 82° C. to 122° C. The heat distortion temperature of polyamide 66 resin is 208° C. to 239° C. The heat distortion temperature of polyamide 6 resin is 144° C. to 208° C. The heat distortion temperature of polyacetal resin is 158° C. to 170° C. The heat distortion temperature of PTFE is 121° C. Notably, the upper limit of the heat distortion temperature of the material of the sleeve can be appropriately selected in accordance with, for example, the easiness of melting at the time of molding. A thermoplastic resin whose heat distortion temperature is equal to or lower than the upper limit (e.g., 300° C.) can be used.

BRIEF DESCRIPTION OF THE DRAWING

FIGS. 4A and 4B show the sleeve of FIG. 3, wherein FIG. 4A is a side view of the sleeve, and FIG. 4B is a sectional view of the sleeve taken along line 4B-4B of FIG. 4A;

FIGS. 8A and 8B show the sleeve of FIG. 7, wherein FIG. 8A is a side view of the sleeve, and FIG. 8B is a sectional view of the sleeve taken along line 8B-8B of FIG. 8A;

DETAILED DESCRIPTION OF THE EMBODIMENT

Figure 1:
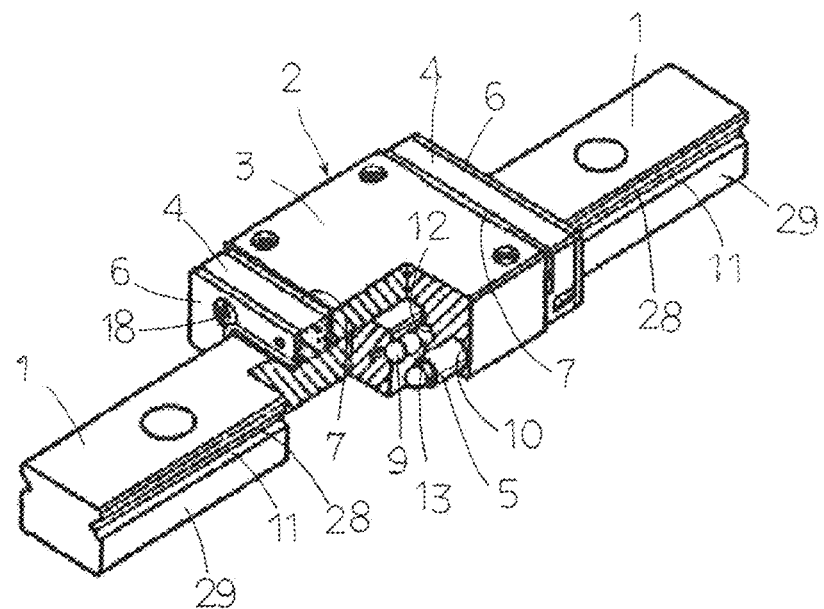
FIG. 1 is a perspective view showing one embodiment of a linear motion guide unit according to the present invention.
Figure 2:
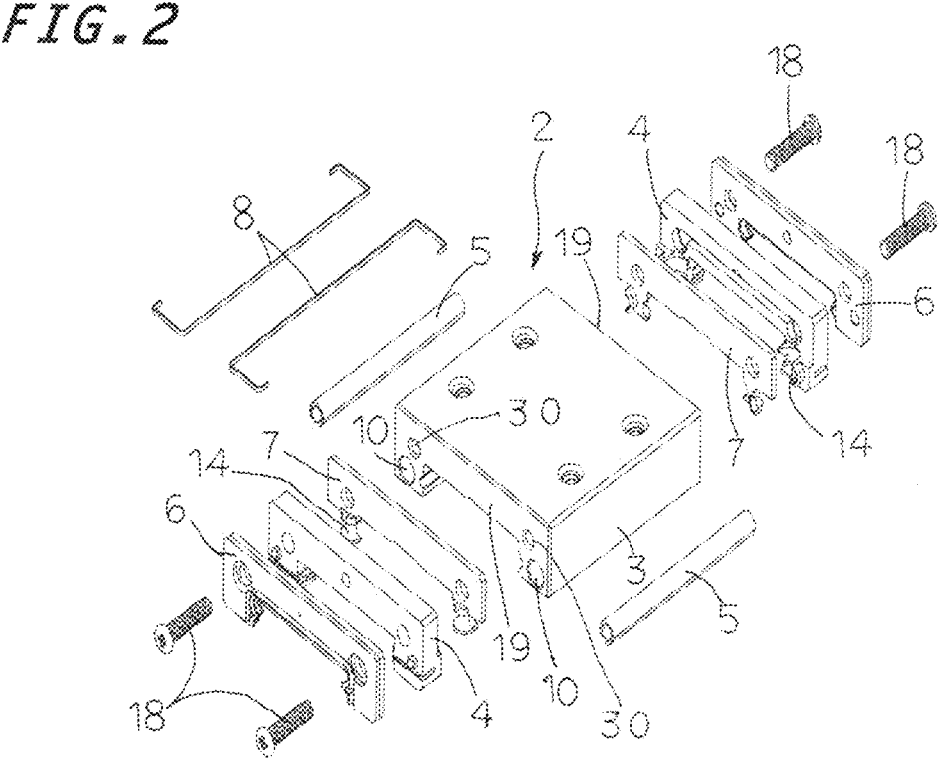
FIG. 2 is an exploded perspective view showing a slider in the linear motion guide unit of FIG. 1.
Figure 3:
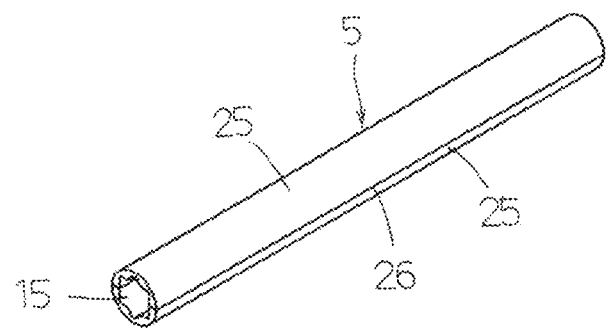
FIG. 3 is a perspective view showing a sleeve in the linear motion guide unit of FIG. 1.
Figure 4A:
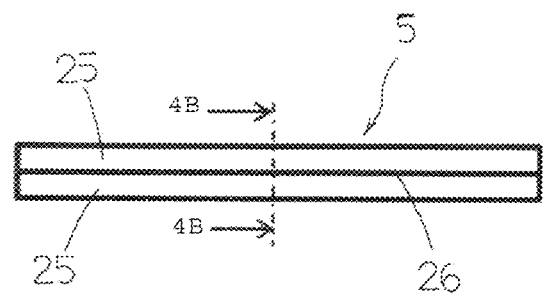
Figure 4B:
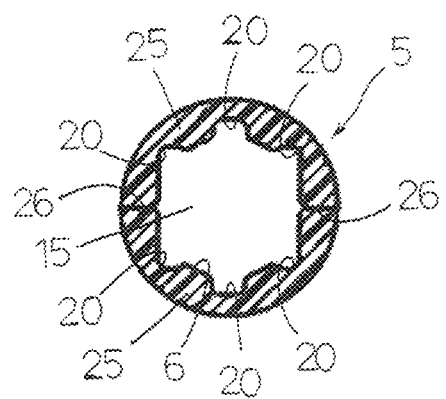
Figure 5:
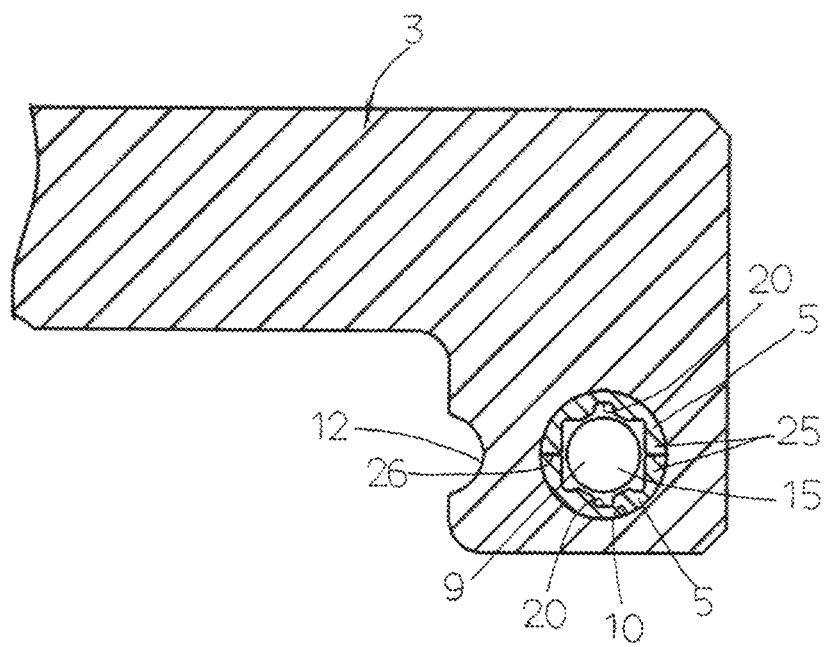
FIG. 5 is a sectional view partially showing a carriage in the linear motion guide unit of FIG. 1 with a sleeve inserted into an insertion hole formed in the carriage.

A linear motion guide unit according to the present invention is preferably incorporated into sliding sections of various apparatuses.

Embodiments of the linear motion guide unit according to the present invention will next be described with reference to the drawings. The linear motion guide unit can be applied to the sliding sections of various types of apparatuses such as various types of assembling apparatuses, various types of industrial robots, precision machines, medical equipment, etc. The linear motion guide unit includes a slider 2 which moves in relation to a guide rail 1 in its longitudinal direction.

First, a first embodiment of the linear motion guide unit according to the present invention will be described with reference to FIGS. 1 to 6. The linear motion guide unit includes the guide rail 1 having raceway grooves 11 (first raceway grooves) formed along opposite longitudinal sides 29, and the slider 2 which has raceway grooves 12 (second raceway grooves) facing the respective raceway grooves 11 of the guide rail 1 and which slides in relation to the guide rail 1 via a plurality of rolling elements (balls) 9. The slider 2 is composed of an upper portion and wing portions extending downward from the opposite sides of the upper portion in such a manner as to straddle the guide rail 1. The slider 2 generally includes a carriage 3, end caps 4, and end seals 6. The carriage 3 has the raceway grooves 12 and return passages 15 extending along the raceway grooves 12. The end caps 4 include spacers 7 disposed on respective opposite end surfaces 19 of the carriage 3 and each have arc turnaround passages 14 which establish communication between the return passages 15 and load-carrying races 13 each formed by the raceway groove 11 and the raceway groove 12. The end seals 6 are disposed on respective end surfaces of the end caps 4. The carriage 3 has insertion holes 10 extending along the raceway grooves 12, and sleeves 5 forming the return passages 15 are inserted into the insertion holes 10. In the present linear motion guide unit, each of the load-carrying races 13 is of a Gothic arch groove type in which each of the rolling elements (balls) 9 is in four-point contact with the raceway groove 11 of the guide rail 1 and the raceway groove 12 of the carriage 3. In the present linear motion guide unit, the load-carrying race 13, the return passage 15, and a pair of the turnaround passages 14 constitute a circulation passage where the balls 9 circulate infinitely. The carriage 3 has threaded holes formed therein for mounting thereon a counter member, such as a workpiece or a device. The guide rail 1 has clearance grooves 28 formed in the raceway grooves 11 extending along the opposite longitudinal sides 29. Holding bands 8 for holding the rolling elements (balls) 9 in the slider 2 extend through the respective clearance grooves 28. The guide rail 1 has mounting holes formed therein for attachment to a bed or a base of equipment, etc. Fixing bolts 18 inserted through mounting holes of the end caps 4 and through mounting holes of the end seals 6 are screwed into threaded holes 30 of the carriage 3, whereby the spacers 7, the end caps 4 and the end seals 6 are fixed to the carriage 3. Each turnaround passage 14 is formed by an outer-side turnaround passage and an inner-side turnaround passage which are formed in the corresponding end cap 4 and the corresponding spacer 7, respectively, in an aligned manner.

The linear motion guide unit is characterized in that the sleeves 5 which are inserted into the insertion holes 10 of the carriage 3 and form the return passages 15 are formed of a thermoplastic resin having a heat distortion temperature higher than 80° C. Each sleeve 5 has grooves 20 which are formed on its inner circumferential surface 16 and which are spaces 22 each serving as a lubricant pool; i.e., a grease pool 27. For the sleeve 5, a material whose heat distortion temperature is higher than 80° C. and not higher than 300° C.; namely, falls in the temperature range of 80° C. to 300° C. Specifically, the thermoplastic resin used to form the sleeve 5 is a synthetic resin such as polyimide resin, polyamide-imide resin, ABS resin, polyethylene terephthalate (PET) resin, polyamide resin, polyacetal resin, polytetrafluoroethylene (PTFE) resin, polyphenylenesulfide resin, or polyether ether ketone (PEEK) resin. In particular, polyamide 66 resin is a preferred example of the polyamide resin used as the thermoplastic resin.

Since this linear motion guide unit is used, for example, in an environment whose normal temperature is 100° C. and whose highest temperature is 120° C., the spacers 7 and the end caps 4 which constitute the slider 2 are formed of a thermoplastic resin whose heat distortion temperature is higher than 80° C. as in the case of the sleeves 5. The thermoplastic resin used to form the end caps 4 is preferably polyamide 66 which is high in heat resistance and wear resistance, for example, "TORAYCA" (registered trademark, carbon fiber blended polyamide 66 produced by Toray Industries, Inc.). The end seals 6 are formed of fluororubber which is high in heat resistance. The material of the end caps 4 and the spacers 7 is not limited to "TORAYCA" and may be a resin whose heat distortion temperature is approximately the same as the heat distortion temperature of the sleeves 5.

As shown in FIG. 3 to FIG. 6, each of the sleeves 5 of the first embodiment is formed by combining split circular members 25 (semi-circular members in the drawings) which are two split sleeves obtained by dividing a cylindrical member along a parting plane 26 extending in the longitudinal direction. In order to form spaces 22 serving as grease pools 27, a plurality of grooves 20 are formed on the inner circumferential surfaces 16 of the split circular members 25 through cutting orthogonal to the parting plane 26. The sleeves 5 are preferably formed by extrusion molding of polyamide 66 having a melting point of 265° C.; i.e., "AMILAN" (registered trademark, nylon 66 produced by Toray Industries, Inc.) The grooves 20 formed on the inner circumferential surface 16 of each sleeve 5 extend in the longitudinal direction and extend orthogonally to the parting plane 26. Since the grooves 20 of each sleeve 5 extend orthogonally to the parting plane 26, at the time of removal of the split circular members 25 of the sleeve 5 from a die, the split circular members 25 can be easily removed in the radial direction. These grooves 20 are formed to serve as the grease pools 27 so that a lubricant can be supplied to rolling elements (balls) 9 rolling through the return passage 15.

Figure 7:
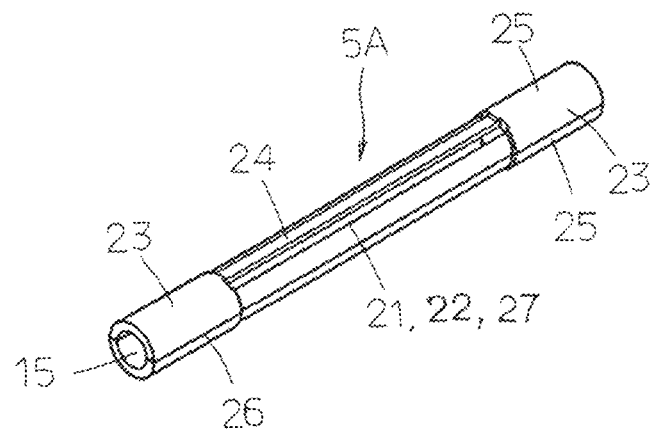
FIG. 7 is a perspective view showing another example of the sleeve used in the linear motion guide unit according to the present invention.
Figure 8A:
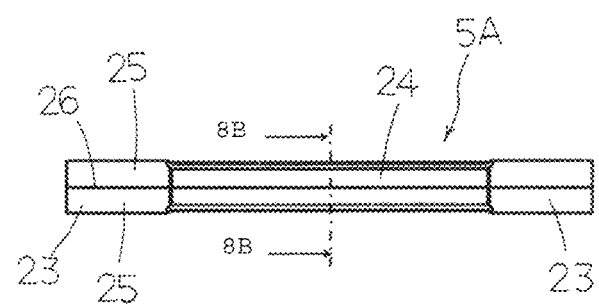
Figure 8B:
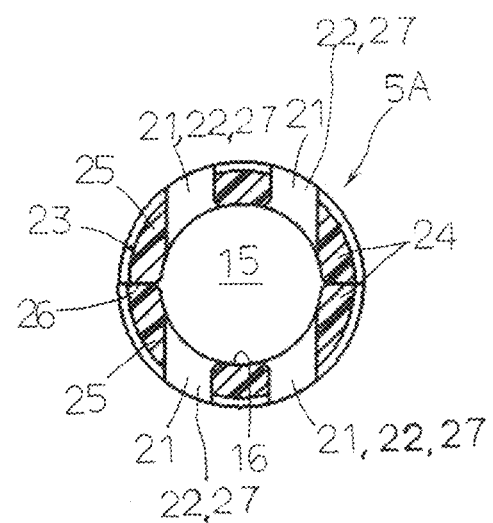
Figure 9:
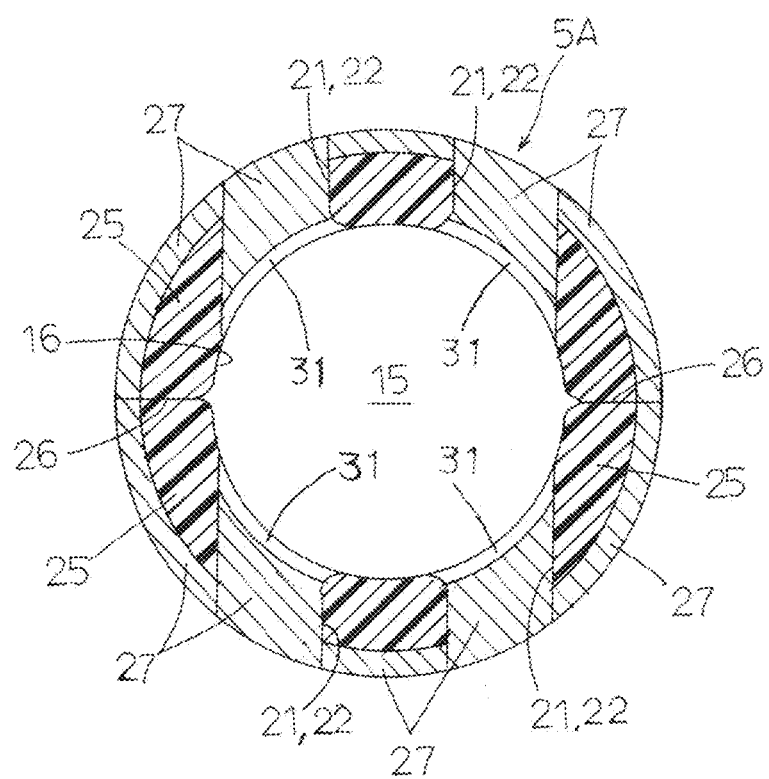
FIG. 9 is an explanatory view showing a cross section of the sleeve of FIG. 7 charged with grease.

Next, a second embodiment of the linear motion guide unit according to the present invention will be described with reference to FIGS. 7 to 9. Since the second embodiment has the same structure as the first embodiment except for a sleeve 5A, components identical with those of the first embodiment are denoted by the same reference numerals and their description and illustration are omitted. In the second embodiment, the sleeve 5A is divided into two pieces. However, the sleeve 5A may be divided into three or four pieces. In contrast to the sleeve 5 of the first embodiment which has the grooves 20 extending from one end 23 of the inner circumferential surface 16 to the other end 23 thereof through a middle part 24, the sleeve 5A of the second embodiment has a plurality of slits 21 extending in the longitudinal direction. The plurality of slits 21 are formed in the sleeve 5A through cutting orthogonal to a parting plane 26 and form spaces 22 serving as grease pools 27. The plurality of slits 21 are located in the middle part 24 of the sleeve 5A. The slits 21 formed in the sleeve 5A serve as the grease pools 27 so that a lubricant can be supplied to rolling elements (balls) 9 rolling through the return passage 15. In this linear motion guide unit, as shown in FIG. 9, grease is charged, for example, such that clearances 31 are formed between the rolling elements 9 and the grease 17.

Next, the results of an endurance test performed on the linear motion guide units in a 120° C. environment will be described.

A high-temperature environment endurance test was performed on Samples 1-1 and 1-2 in which the sleeves 5 of the first embodiment was used, Sample 2 in which the sleeves 5A of the second embodiment was used. Comparative Examples 1 and 2 were samples of a linear motion guide unit of a type in which return passages were directly formed in the carriage without use of sleeves.

Notably, the test was performed under the condition that the above-described TORAYCA was used for the end caps 4 and the spacers 7, and the type of lubricant (grease) was changed. The highest operating temperatures of greases used in the present test are all 200° C. The stainless steel-made linear motion guide unit used in the test is a linear motion guide unit (LWLF 18C1R . . . BH) produced by NIPPON THOMPSON CO., LTD and having a rail width of 18 mm, a basic load rating (C) of 2280 N, and a basic static load rating (Co) of 3810 N.

<Test Conditions>

Ambient temperature: 120° C.

Load applied to each linear motion guide unit: 114 N (downward load)

Stroke of the slider 2 in each linear motion guide unit: 300 mm

Highest speed of the slider 2: 60 m/min

Average speed of the slider 2: 34.7 m/min

The travel distance of the slider 2 on the guide rail 1 was measured as follows. The test for each linear motion guide unit was stopped when the vibration of the linear motion guide unit exceeded a predetermined level or a lubrication failure, such as anomalous generation of wear debris, was recognized, and the travel distance up to that point in time was measured. Table 1 shows the results of the high-temperature environment endurance test performed on the linear motion guide units.

(Space)

TABLE 1

| Sample | Sleeve shape and material | Charged grease | Material of end cap | Travel distance (km) |
|---|---|---|---|---|
| 1-1 | Groove polyamide 66 | Multemp ET100K produced(Kyodo Yushi Co., Ltd.) | TORAYCA produced by Toray Industries, Inc. | 12506 |
| 1-2 | Groove polyamide 66 | Daphne Eponex SR2 produced(Idemitsu Kosan Co., Ltd.) | TORAYCA produced by Toray Industries, Inc. | 14897 |
| 2 | Slit polyamide 66 | Daphne Eponex SR2 Produced(Idemitsu Kosan Co., Ltd. | TORAYCA produced by Toray Industries, Inc. | 11309 |
| Comparative Example 1 | No sleeve | Multemp ET100K produced(Kyodo Yushi Co., Ltd.) | Steel | 530 |
| Comparative Example 2 | No sleeve | Daphne Eponex SR2 produced(Idemitsu Kosan Co., Ltd.) | Steel | 1460 |

As shown in Table 1, the travel distances of Samples 1-1, 1-2, and 2 in which the sleeves 5 and 5A of the first embodiment and the second embodiment were used, respectively, are about 10 to 20 times the travel distances of Comparative Examples 1 and 2 in which the sleeves were not used. This shows that use of the sleeves 5 of the first embodiment or the sleeves 5A of the second embodiment extends so-called lubrication life; i.e., the travel distance of each linear motion guide unit up to the point when the linear motion guide unit stops due to a lubrication failure. Notably, after the above-described test, an anomaly such as wear was not observed on the sleeves 5 and 5A, the end caps 4, and the spacers 7.

Here, the principle by which the sleeves 5 of the first embodiment extended the lubrication life will be described.

Figure 6:
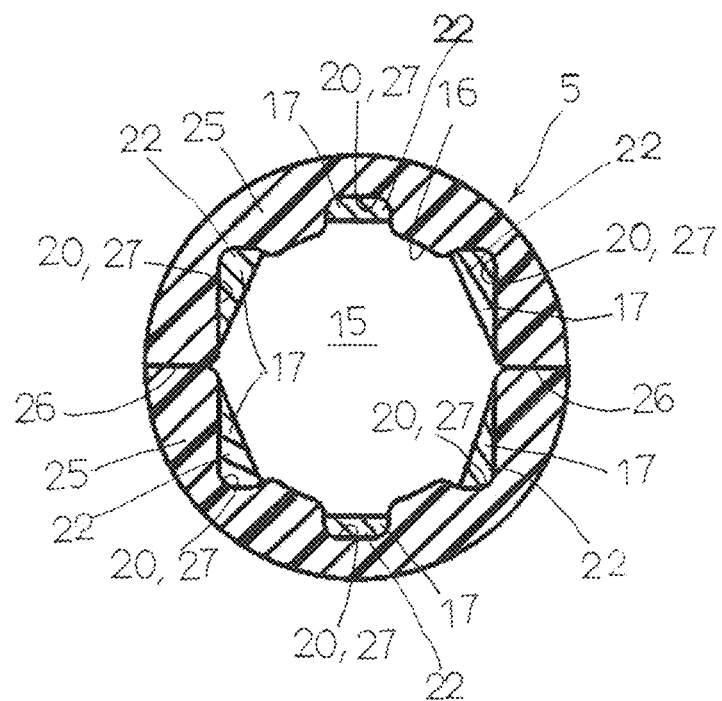
FIG. 6 is an explanatory view showing a cross section of the sleeve of FIG. 3 charged with grease.
Figure 10:
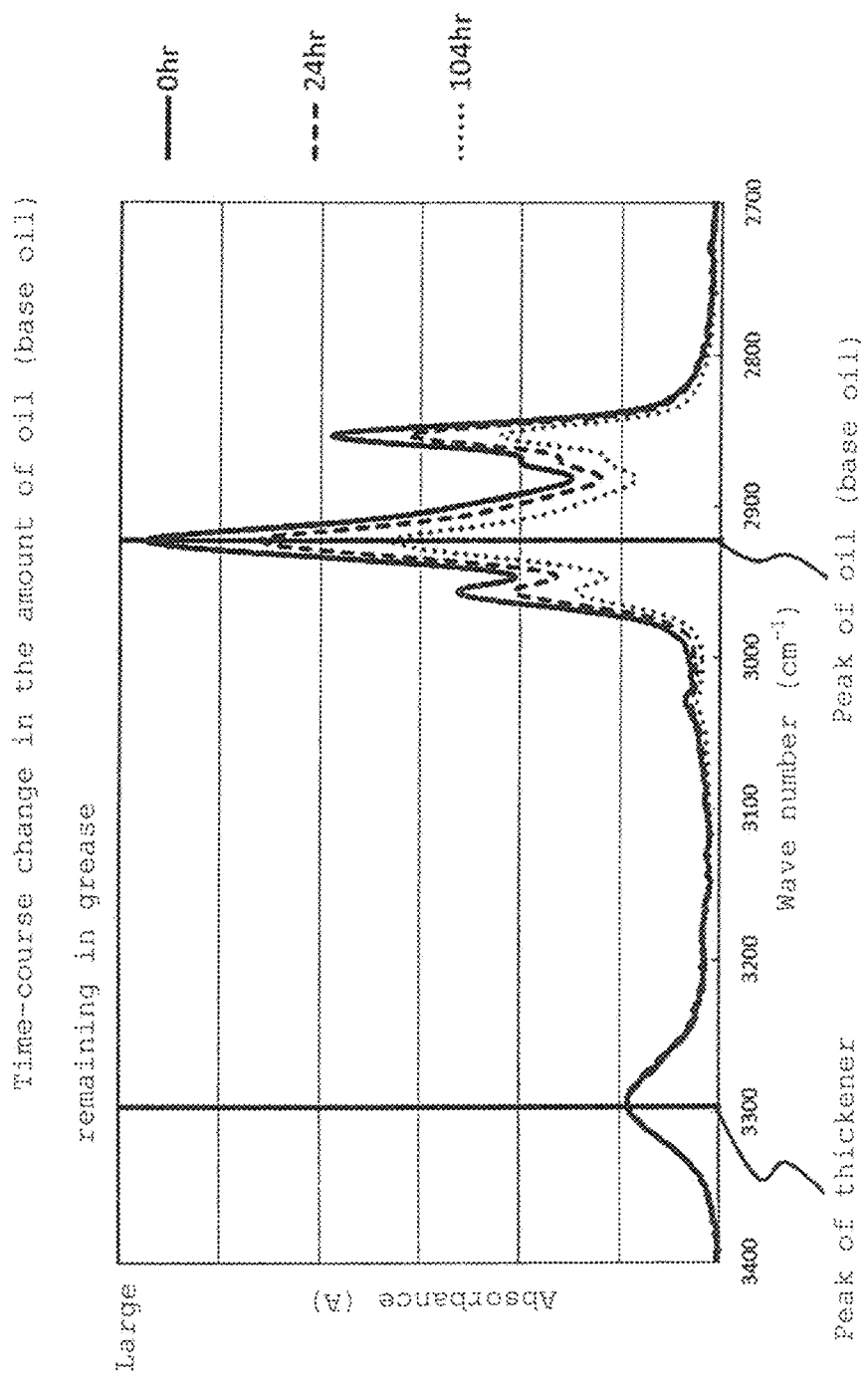
FIG. 10 is a graph showing the result of measurement, by FTIR, of a time-course change in the amount of oil remaining in grease in various types of sleeves used in the linear motion guide unit.

The grease 17 was charged in each sleeve of a linear motion guide unit as shown in FIG. 6, and the linear motion guide unit was caused to travel under the same conditions as those of Sample 1-1 of Table 1. The grease 17 at the groove position was measured by FTIR (ATR method, Fourier Transform Infrared Spectroscopy) under the following measurement conditions before the start of travel (0 hr) and after elapse of 24 hr and 104 hr, respectively, after the start of travel. FIG. 10 shows the measurement results. FIG. 10 is a graph whose vertical axis represents absorbance (A) and whose horizontal axis represents wave number (cm-1). Notably, for easy understanding of the measurement results, the graph of FIG. 10 is depicted such that the peak intensity (absorbance) of the thickener (wave number: 3296 cm-1) contained in the grease at each point in time has the same value for comparison of the peak intensities (absorbances) of the base oil (wave number: 2922 cm-1 at the three measurement points in time.

As is apparent from FIG. 10, with elapse of the travel time of the linear motion guide unit, the absorbance of the base oil at the position of the grooves 20 decreases. From this, it is estimated that the base oil which is contained in the grease 17 and contributes to lubrication is gradually supplied from the grooves 20 to the rolling elements 9. As to the sleeve 5A of the second embodiment, it is estimated that the base oil contained in the grease 17 in the slits 21 is gradually supplied to the rolling elements 9, so that the lubrication life is extended as in the case of the first embodiment. Accordingly, it is estimated that the filling amount of the grease 17 can be increased by an amount corresponding to the depth of the grooves 20, the base oil contained in an increased amount of the grease 17 is gradually supplied to the rolling elements 9, and consequently, the lubrication life can be extended as shown in Table 1. Notably, the material of the sleeves 5 is not limited to the above-described polyamide 66, and any thermoplastic resin whose heat distortion temperature is higher than the heat distortion temperature of generally used polyethylene may be used. Examples of such a thermoplastic resin include polyimide resin, polyamide-imide resin, ABS resin, PET resin, polyamide resin, polyacetal resin, PTFE resin, polyphenylenesulfide resin, and polyether ether ketone resin.

In the case where the sleeves 5 used in the linear motion guide unit are formed of PTFE, fluorine grease which is conformable to PTFE is used as the grease 17. In contrast, since a various types of greases can be used for polyamide 66, preferably, the sleeves 5 are formed of polyamide 66 (=nylon 66: registered trademark). Needless to say, each sleeve 5 is not limited to the above-described two-piece split-type and may be a single-piece cylindrical member having grooves or slits. Notably, in the case where a linear motion guide unit having a small size is used, it preferred to use the two-piece split circular member 25 of the first embodiment or the second embodiment in which grooves or slits can be easily formed. Notably, needless to say, the spaces 22 formed in the sleeves 5 and 5A and serving as grease pools 27 are not limited to the grooves 20 or the slits 21 and may be a plurality or recesses, holes, or the like. The method of molding the sleeves 5 and 5A is not limited to extrusion molding, and an injection molding or the like may be used. In the first embodiment and the second embodiment, the sleeves 5 or 5A, the end caps 4, and the spacers 7 are formed separately. However, for example, a spacer may be integrally formed at one end of each sleeve through use of the same resin as the sleeve. Needless to say, a thermoplastic resin having high abrasion resistance may be used for the sleeves 5 and 5A, the end caps 4, and the spacers 7. The linear motion guide unit according to the present invention can be used in an apparatus having a high-temperature heat source such as a wire bonding apparatus.

What is claimed is:

1. A linear motion guide unit comprising:
   an elongated guide rail having a first raceway groove formed along each of opposite sides extending in a longitudinal direction; and a slider which slides on the guide rail in the longitudinal direction,
   wherein the slider comprises:
   a carriage which has a second raceway groove extending to face the first raceway groove of the guide rail and an insertion hole extending along the second raceway groove;
   a sleeve which is inserted into the insertion hole so as to form a return passage;
   a pair of end caps which are attached to opposite end surfaces of the carriage and each of which has a turnaround passage communicating with the return passage and a load-carrying race formed between the first raceway groove and the second raceway groove; and
   a plurality of rolling elements which roll through a circulation passage formed by the load-carrying race, the return passage, and the paired turnaround passages, and
   wherein the sleeve is not porous and formed of a thermoplastic resin selected from a group consisting of polyimide resin, polyamide-imide resin, ABS resin, polyethylene terephthalate (PET) resin, polyamide resin, polyacetal resin, polytetrafluoroethlylene (PTFE) resin, polyphenylenesulfide resin, and polyether ether ketone (PEEK) resin, and has a space serving as a grease pool.

2. A linear motion guide unit according to claim 1, wherein the polyamide resin which is the thermoplastic resin is polyamide 66 resin.

3. A linear motion guide unit according to claim 1, wherein the sleeve is formed by combining semi-circular members obtained by dividing a cylindrical member into at least two pieces along its longitudinal direction, and, in order to form the space serving as the grease pool, a plurality of grooves or a plurality of slits are formed in the semi-circular members through cutting orthogonal to a parting plane between the semi-circular members.

4. A linear motion guide unit according to claim 1, wherein the end caps are formed of a thermoplastic resin whose heat distortion temperature is higher than 80° C.

5. A linear motion guide unit according to claim 4, wherein the heat distortion temperature of the end caps falls within a range of 80° C. to 300° C.

* * * * *